May 27, 1958  A. J. WAYMAN  2,836,437
ECCENTRIC COUPLER FOR ATTACHING SERVICE ENTRANCE
MASTS FOR METERS
Original Filed June 29, 1954

INVENTOR
ALBERT J. WAYMAN

BY Ralph B. Stewart

ATTORNEY

2,836,437

ECCENTRIC COUPLER FOR ATTACHING SERVICE ENTRANCE MASTS TO METERS

Albert J. Wayman, East Palestine, Ohio

Continuation of application Serial No. 440,045, June 29, 1954. This application August 16, 1957, Serial No. 678,730

4 Claims. (Cl. 285—158)

This invention relates to electrical service entrance masts of a type commonly used for ranch type houses and low commercial buildings, and in particular to an improved manner of mounting such a mast and to a novel fitting for coupling the mast to the electric meter.

This application is a continuation of my application Serial No. 440,045, filed June 29, 1954.

In the past, it has been the usual practice to use ordinary pipe fittings when erecting a mast of steel pipe. Since, in most cases, the size of pipe required by strength considerations far exceeds the size of pipe required by electrical safety codes, it is necessary to provide a mast having a reduced lower portion in order to effect the proper connection with the standard electric meter or its housing. When this is accomplished by using standard pipe fittings, the mast cannot be mounted closely against the wall of the building but is held away from the wall by the flanges of the pipe fitting. In addition, it may become necessary to block the meter base out from the wall or form an offset in the reduced portion of the mast in order to line up the aperture in the meter base with the reduced portion of the mast.

An object of my invention is to provide an improved service entrance mast which may be clamped tightly and closely against the wall of a building, thus providing a firm support for the mast.

Another object of the invention is to provide a mast having a reduced lower portion which may be easily aligned with the aperture in a meter base mounted directly on the wall.

One form of the invention is illustrated in the accompanying drawing, in which.

Figure 1:
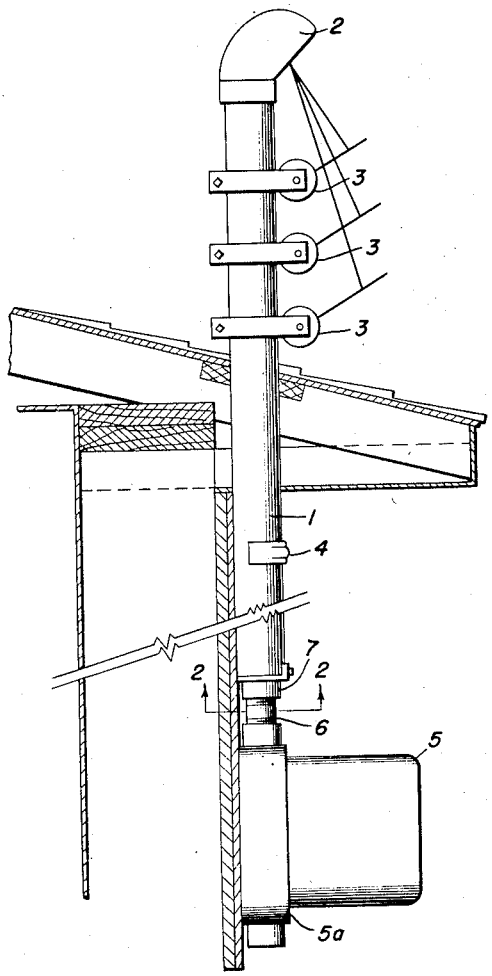
Figure 1 is a side elevational view, with the building shown in section, of a typical electrical service entrance mast installation according to my invention.
Figure 3:
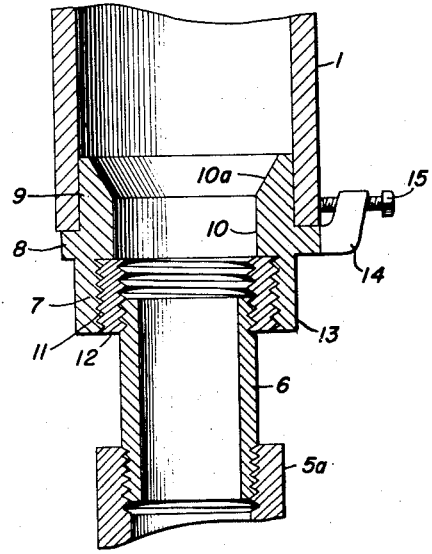
Figure 3 is a cross-sectional fragmentary view on the same enlarged scale taken along the line 3—3 of Figure 2.

Referring to the drawing, a large pipe or conduit 1 forms the main portion of the service entrance mast and has a cap 2 and insulators 3 mounted on the upper end thereof. The pipe is clamped to the wall of the building by a plurality of clamps 4 (only one being illustrated in the drawing) and a meter 5 is mounted in a base 5a which is mounted on the outside wall of the building below the lower end of the pipe 1. In a typical installation the mast will comprise a length of standard 2″ black iron pipe and the meter base 5a will have an internally threaded hub 5b for connecting a 1″ or a 1¼″ pipe. Therefore the lower end of the mast must be reduced to the size of pipe required for connection to the meter base, say, for example, a 1″ pipe. This is accomplished by connecting a short length of smaller pipe or conduit 6 to the large pipe 1 by means of fitting 7.

This fitting is formed of a tubular sleeve 7 having an external flange 8 formed thereon intermediate the ends of the sleeve and having an external diameter approximately the same as the outside diameter of pipe 1. The upper portion of the fitting, above flange 8, is formed with a smooth outer cylindrical surface 9 and has a sliding fit with the inside wall of pipe 1. The central bore 10 of sleeve 7 is concentric with the outer wall 9 and is provided with a flared, conical portion 10a at the upper end of the sleeve to facilitate the threading of electric conductors through the fitting easily and without damage to the insulation on the conductors.

Figure 2:
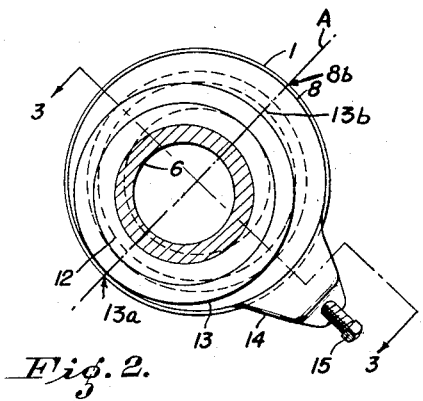
Figure 2 is a sectional view, on an enlarged scale, taken along the line 2—2 of Figure 1.

The lower end of the fitting on the opposite side of flange 8 has an internally threaded aperture or bore 11 formed therein, this aperture being eccentric with respect to flange 8 and with respect to the central bore 10. Where the fitting is to be used with different meters having different sized pipe connections, the aperture 11 will be threaded for the larger size and is provided with a threaded adapter bushing 12 for accommodating a smaller size of pipe. The outer wall 13 of the lower end portion of sleeve 7 is concentric with bore 11 and therefore is eccentric with flange 8. At one point the wall 13 extends substantially to the outer edge of flange 8, see point 13a in Fig. 2. At the diametrically opposite point 13b, the outer wall 13 of the lower section of sleeve 7 is displaced inwardly a maximum amount from the outer edge of flange 8 at the point 8b located on the axis of symmetry A. Threaded into the bushing 12 (or the aperture 11 in some cases) is a section of smaller diameter pipe or conduit 6 of the size required to mate with the hub 5b provided in the base 5a of the meter 5. In order to lock the fitting 7 to the pipe 1 and to provide electrical continuity between the fitting and the pipe, a lug 14 is formed integral with flange 8 and extends upwardly into over-lapping relation with the wall of pipe 1 and has a set-screw 15 threaded therethrough so as to engage pipe 1. This lug 14 is positioned on the flange 8 at a point approximately 90° from the axis of symmetry of the fitting 7 (or substantially at right angles to the direction of eccentricity) so as to allow the fitting to be rotated in pipe 1 throughout the full range of eccentric adjustment without interference between the lug 14 and the wall of the building.

It will be seen that since flange 8 is approximately the same diameter as pipe 1, the pipe will not be held away from the wall by the fitting but will be held tightly against the wall by clamps 4, thus increasing the rigidity of the mounting. In addition, any mis-alignment which exists between the center line of pipe 1 and the center line of the aperture in the base of meter 5 may be compensated for by rotating fitting 7 in pipe 1 until pipe 6 is aligned with the aperture in the meter base. This adjustment may be easily and quickly made, reducing the expense of the installation and providing a generally more rigid installation with a cleaner appearance than installations made with conventional pipe fittings. Such adjustment will allow for maximum displacement of the meter hub 5b from the supporting wall surface if the lug 14 on the flange 8 is displaced from the point 8b by a substantial angle so that the point 8b may be moved to a position to have contact with the wall without interference between the lug and the wall.

What I claim is:

1. A service entrance mast comprising, a meter base mounted upon a supporting surface, a large conduit clamped against said surface above said meter base, a smaller conduit mounted on said meter base below the lower end of said large conduit and spaced from said surface, and a coupling member connecting said large conduit and said smaller conduit, said coupling member comprising a sleeve having an external flange intermediate of its ends, said flange having an external diameter substantially equal to the outside diameter of said large conduit, the upper end portion having a smooth external wall concentric with said flange and having close sliding engagement with the inside wall of said large conduit, said coupling member further having an internally threaded bore formed in the lower end portion thereof and being eccentric with said flange, the outer wall of said lower end portion being concentric with said threaded bore and being substantially flush with the outer edge of said flange at one point about the periphery of said flange, said coupling member being rotatable in said large conduit to align said threaded bore with said smaller conduit and thereby to permit threaded engagement between said threaded bore and said smaller conduit, means for clamping said coupling member to said large conduit comprising a lug formed integrally with the flange on said coupling member and extending into overlapping relation with the wall of said large conduit, and a set-screw threaded through said lug and engaging said large conduit, said lug being positioned on said flange at a point substantially 90° from the axis of symmetry of said fitting, whereby said fitting may be rotated throughout the full range of eccentric adjustment without interference between said lug and said supporting surface.

2. A service entrance mast comprising, a meter base mounted on the wall of a building, a large conduit clamped to said wall, a smaller conduit mounted on said meter base and spaced from said wall, and a fitting joining said large conduit and said smaller conduit, said fitting comprising a tubular sleeve having an external flange near the center thereof, said flange having an outside diameter substantially the same as the outside diameter of said large conduit, one end portion of said sleeve having a smooth outer cylindrical wall concentric with said flange and engaging the inside wall of said large conduit in close sliding engagement, the other end portion of said sleeve having concentric inner and outer walls arranged in eccentric relation with said flange, the outer wall of said other end portion being substantially flush with the outer edge of said flange at one point about the periphery of said flange, and said smaller conduit engaging the inner wall of said other end portion, a lug formed on said flange and extending over said one end portion of said sleeve, and a set-screw threaded through said lug and bearing upon said large conduit, said lug being positioned on said flange at a point substantially 90° from the axis of symmetry of said fitting, whereby said fitting may be rotated throughout the full range of eccentric adjustment without interference between said lug and said wall.

3. A fitting for coupling together two electric conduits of different sizes comprising, a sleeve having an external flange formed near the middle thereof, one end portion of said sleeve, on one side of said flange, having cylindrical concentric inner and outer walls arranged concentric with said flange, the outer end portion of the inner wall of said one section being formed into a conical surface, the other end section of said sleeve on the opposite side of said flange having concentric inner and outer walls arranged eccentrically with respect to said flange with the outer wall thereof arranged substantially flush with the outer edge of said flange at one point about the periphery of said flange, a lug formed integrally with said flange and extending over said one end portion of said sleeve in spaced relation thereto, said lug being positioned on said flange at a point substantially 90° from the axis of symmetry of said fitting, and a set-screw threaded transversely through said lug and extending radially of said one end section.

4. A service entrance mast installation comprising, a meter base mounted upon a supporting surface, a large conduit clamped against said surface above said meter base and having its lower end terminating in spaced relation above said meter base, said meter base having an upstanding internally-threaded hub thereon disposed in spaced relation below the lower end of said large conduit with the axes of the hub and large conduit being disposed in parallel but offset relationship with respect to each other, and a coupling assembly connecting said large conduit and said hub, said coupling assembly comprising a sleeve located in the lower end portion of said conduit and having a smooth external wall in close sliding engagement with the inside wall of said large conduit, said sleeve having an external flange extending radially therefrom and an annular seat for the lower end of said conduit, said flange having an external diameter substantially equal to the outside diameter of said conduit and extending over the end of said conduit entirely around the circumference thereof, said coupling assembly further having a tubular connection extending below said flange and being eccentric with respect to said flange and with respect to the sleeve element above the flange, said tubular connection having a smaller internal diameter than the internal diameter of said sleeve, the internal wall of said sleeve being gradually reduced in diameter to provide a smoothly tapered inner surface merging into the inner surface of said tubular connection for guiding the ends of electric conductors through said sleeve and into said tubular connection, the lower end of said tubular connection having threaded connection with said internally-threaded hub, said coupling assembly being rotatable in said large conduit to align said tubular connection with said hub to compensate for the offset relation between the axes of said large conduit and said hub, means for clamping said coupling assembly to said large conduit and for grounding said meter base to said conduit comprising a lug formed integrally with said flange on the coupling assembly and extending into overlapping relation with the wall of said large conduit, and a set-screw threaded through said lug and engaging said large conduit, said lug being positioned on said flange at a point displaced a substantial angle from the axis of symmetry of said coupling as measured from the point on said axis at which the wall of said lower tubular connection is displaced inwardly a maximum amount from the edge of said flange, whereby said fitting may be rotated into a position to accommodate maximum displacement of the hub of said meter base from said supporting surface without interference between the lug and said supporting surface.

References Cited in the file of this patent
UNITED STATES PATENTS

| | | |
|---|---|---|
| 1,983,866 | Mikulasek | Dec. 11, 1934 |
| 2,506,064 | Christie | May 2, 1950 |

UNITED STATES PATENT OFFICE
CERTIFICATE OF CORRECTION

Patent No. 2,836,437                                            May 27, 1958

Albert J. Wayman

It is hereby certified that error appears in the printed specification of the above numbered patent requiring correction and that the said Letters Patent should read as corrected below.

Column 4, line 23, after the word "and" insert -- providing --.

Signed and sealed this 22nd day of July 1958.

(SEAL)
Attest:
KARL H. AXLINE
Attesting Officer

ROBERT C. WATSON
Commissioner of Patents